United States Patent
Tang et al.

(10) Patent No.: US 12,535,362 B2
(45) Date of Patent: Jan. 27, 2026

(54) METHOD OF STABILIZING TEMPERATURE SENSING IN THE PRESENCE OF TEMPERATURE-SENSING COMPONENT TEMPERATURE VARIATION

(71) Applicant: NATIONAL CHUNG SHAN INSTITUTE OF SCIENCE AND TECHNOLOGY, Taoyuan (TW)

(72) Inventors: Shiang-Feng Tang, Taoyuan (TW); Shun-Lung Yen, Taoyuan (TW); Kuo-Jen Chang, Taoyuan (TW); Hsin-Chang Chen, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 862 days.

(21) Appl. No.: 17/707,997

(22) Filed: Mar. 30, 2022

(65) Prior Publication Data

US 2023/0314238 A1   Oct. 5, 2023

(51) Int. Cl.
  *G01K 1/20*   (2006.01)
  *G01J 5/53*   (2022.01)
  *G01K 11/30*  (2006.01)

(52) U.S. Cl.
  CPC .................. *G01K 1/20* (2013.01); *G01J 5/53* (2022.01); *G01K 11/30* (2013.01)

(58) Field of Classification Search
  CPC ... G01K 1/20; G01K 11/30; G01J 5/53; G01J 5/00

(Continued)

(56) References Cited

U.S. PATENT DOCUMENTS 5,274,578 A * 12/1993 Noeth .................... G01D 3/022
                                                    348/E5.081
5,602,389 A *  2/1997 Kato ......................... G01J 5/53
                                                       250/493.1

(Continued)

FOREIGN PATENT DOCUMENTS

CN      102564598 A  *  7/2012
DE  102020208813 A1  *  1/2022

(Continued)

OTHER PUBLICATIONS

17707997_2024-12-03_DE_102020208813_A1_H.pdf,Jan. 20, 2022.*

(Continued)

*Primary Examiner* — John E Breene

(57) ABSTRACT

A method of stabilizing temperature sensing in presence of temperature-sensing component temperature variation includes steps of: obtaining response value caused by black body at first temperature of a thermal imager core chip; obtaining high-temperature first-order linear function of high-temperature black body response value versus thermal imager core chip temperature; obtaining low-temperature first-order linear function of low-temperature black body response value versus thermal imager core chip temperature; obtaining response value of high-temperature first-order linear function at first temperature, response value of high-temperature first-order linear function at second temperature of the thermal imager core chip, response value of low-temperature first-order linear function at first temperature, response value of low-temperature first-order linear function at second temperature, and response value of black body and substituting the five values into an equation for correcting the response values; and obtaining instant corrected value of the response value of the black body.

2 Claims, 4 Drawing Sheets

(58) Field of Classification Search
USPC .................................................. 702/135, 136
See application file for complete search history.

(56) References Cited

U.S. PATENT DOCUMENTS

| | | | | |
|---|---|---|---|---|
| 5,967,992 A | * | 10/1999 | Canfield | ................ G01K 7/42 374/E7.042 |
| 2016/0018266 A1 | * | 1/2016 | Hodgins | ................ G01J 5/10 250/252.1 |

FOREIGN PATENT DOCUMENTS

| JP | 2013170946 A | * | 9/2013 |
|---|---|---|---|
| RU | 2700338 C1 | * | 9/2019 |

OTHER PUBLICATIONS

17707997_2024-12-04_CN_102564598_A_H.pdf,Jul. 11, 2012.*
17707997_2024-12-04_JP_2013170946_A_H.pdf,Sep. 2, 2013.*
17707997_2024-12-04_RU_2700338_C1_H.pdf,Sep. 16, 2019.*

* cited by examiner

METHOD OF STABILIZING TEMPERATURE SENSING IN THE PRESENCE OF TEMPERATURE-SENSING COMPONENT TEMPERATURE VARIATION

BACKGROUND OF THE INVENTION

1. Field of the Invention

The present disclosure relates to methods of stabilizing temperature sensing in the presence of temperature-sensing component temperature variation, and in particular to a method of correcting response output which does not vary with thermal imager core temperature.

2. Description of the Related Art

After undergoing nonuniform correction and dead point compensation, a conventional thermal imager in operation is able to display thermal images, though its temperature response curve varies with the temperature of the sensing core (for example, Focal Plane Array, FPA) chip in the thermal imager. As shown in FIG. 1, its response value (count) decreases, as time and sensing core (for example, FPA) chip temperature increase. For example, the result of an experiment conducted on standard black bodies, which are spaced apart by a fixed distance and stand at 49.5° C., 37.5° C., 25.5° C., for 40 minutes shows that the sensing core (for example, FPA) chip demonstrates a tendency toward a monotonous increase in its operating temperature as operation time passes by. Therefore, if the conventional thermal imager functions as a temperature sensing thermal imager capable of measuring a target temperature and its system operation time gradually extends, its output response value will decrease; thus, the conventional thermal imager is unfit to perform accurate temperature measurement on a target for a long period of time.

To maintain the stability of a target temperature measured with a temperature sensing device for a long period of time, the prior art provides three solutions. First, provide a temperature-sensing sensor to a constant operating environment, for example, use an external thermoelectric refrigerator to keep the temperature-sensing sensor at a constant temperature, or provide an overall temperature sensing system operating temperature thermal insulating constant environment. Second, provide an external black body standard temperature source that is equidistant relative to a target temperature and serves as a reference standard for use in measuring a target temperature, for example, correct the temperature difference between the temperature value and an external standard temperature source according to an internal correction regression parameter so as to obtain an accurate temperature. Third, an image single-point correction black body surface shutter is disposed in front of a temperature-sensing sensor, and a contact-style temperature sensor is disposed in the vicinity of the black body surface shutter, to confirm an output response value (usually expressed as a response value whenever digital quantization is recommended) corresponding to the temperature measured by the temperature sensing sensor within each time period, then infer an output response value of an external measurement target within the next time period, and finally convert the output response value into the current actually measured temperature value. The third solution has a drawback: an abrupt change in ambient temperature causes a correction black body surface shutter temperature to vary, and thus the correction black body surface must always be turned on and turned off in order to perform instant reference temperature difference compensation, confirming the stability and precision of temperature measurement.

BRIEF SUMMARY OF THE INVENTION

To maintain the stability of temperature sensing for a long period of time, all conventional methods require complicated hardware design or computation process flow, indicating that the temperature measurement performed with the conventional thermal imager on a target for a long period of time is still defective. The main objective of the present disclosure is to provide a method of stabilizing temperature sensing in the presence of temperature-sensing component temperature variation, which involves figuring out the intended temperature sensing target temperature range, plotting the graphs of the operating temperature of the sensing core (for example, Focal Plane Array, FPA) in the thermal imager during the measurement process versus time, finding a universal linear correction mathematical principle, performing fixed-value normalization correction computation in the core image computation chip or computer CPU/GPU, and obtaining a corrected output response strength value, so as to instantly correct a response value of temperature measurement, obtain a precise and stable temperature value, and subsequently reduce the complexity of temperature sensing thermal imager system hardware insulation and heat dissipation design, system volume and power consumption. In conclusion, the present disclosure is effective in cutting manufacturing and development cost without altering any system hardware framework.

To achieve at least the above objective, the present disclosure provides a method of stabilizing temperature sensing in the presence of temperature-sensing component temperature variation. The steps of the method comprise: (S1) obtaining a response value caused by a black body at a first temperature of a thermal imager core chip; (S2) obtaining, by preliminary experiment, a high-temperature first-order linear function ($f_H$) expressing relationship between a high-temperature black body response value and the thermal imager core chip temperature; (S3) obtaining, by preliminary experiment, a low-temperature first-order linear function ($f_L$) expressing relationship between a low-temperature black body response value and the thermal imager core chip temperature; (S4) obtaining a response value ($f_H(t_1)$) of the high-temperature first-order linear function at the first temperature, a response value ($f_H(T_2)$) of the high-temperature first-order linear function at a second temperature of the thermal imager core chip, a response value ($f_L(T_1)$) of the low-temperature first-order linear function at the first temperature, a response value ($f_L(T_2)$) of the low-temperature first-order linear function at the second temperature, and a response value (x) of the black body and substituting the five values into an equation for correcting the response values; and (S5) obtaining an instant corrected value of the response value of the black body.

Preferably, the equation for correcting the response values is as follows:

$$d = \left\{ \left[ 1 - \frac{f_H(T_1) - x}{f_H(T_1) - f_L(T_1)} \right] \times [f_H(T_1) - f_H(T_2)] \right\} + \left\{ \left[ 1 - \frac{x - f_L(T_1)}{f_H(T_1) - f_L(T_1)} \right] \times [f_L(T_1) - f_L(T_2)] \right\}$$

where d denotes the instant corrected value, x denotes a response value of the black body, $f_H(T_1)$ denotes a response value of the high-temperature first-order linear function at the first temperature, $f_H(T_2)$ denotes a response value of the high-temperature first-order linear function at the second temperature, $f_L(T_1)$ denotes a response value of the low-temperature first-order linear function at the first temperature, and $f_L(T_2)$ denotes a response value of the low-temperature first-order linear function at the second temperature.

Preferably, the high-temperature first-order linear function is obtained through derivation of a relationship between the high-temperature black body response value and a time and a relationship between the thermal imager core chip temperature and the time.

Preferably, the low-temperature first-order linear function is obtained through derivation of a relationship between the low-temperature black body response value and a time and a relationship between the thermal imager core chip temperature and the time.

Preferably, the black body temperature is measured for around one hour while the temperature of the thermal imager core chip is rising, such that after the response value of the black body has been corrected according to the instant corrected value, a black body temperature value is obtained with a thermal radiation conversion equation, with a standard deviation less than or equal to 0.09° C.

Therefore, the present disclosure has advantages as follows: provide a method of stabilizing temperature sensing in the presence of temperature-sensing component temperature variation to obtain a corrected response strength value equalizing equation by linear regression first-order correction and obtain a precise, stable temperature value by loading software to a computation chip module or performing instant computation with a computer or microprocessor. Therefore, the present disclosure avoids extra system volume, precludes escalated power consumption, and dispenses with any intricate hardware thermal insulating device. Moreover, the present disclosure addresses a conventional issue with heat dissipation, that is, a heat sink of a sensing core (for example, FPA) chip operating at a constant operating temperature has to be specially designed in order to be capable of conveying the residual heat of the sensing core (for example, FPA) chip to the casing efficiently. Furthermore, the present disclose solves a problem: the conventional thermal imager cannot work without precise temperature control mechanism and requires long-term, stable ambient temperature of the sensing core (for example, FPA) chip in order to attain an accurate, stable measured temperature for a long period of time. In conclusion, the present disclosure is conducive to a reduction in system design complexity, hardware cost and power consumption with a view to attaining the advantage of stable temperature sensing.

The above brief description, the detailed description below, and the accompanying drawings are intended to explain the ways and means of achieving the predetermined objectives of the present disclosure and advantages thereof. The other objectives and advantages of the present disclosure are explained in the subsequent description and the accompanying drawings.

DETAILED DESCRIPTION OF THE INVENTION

To facilitate understanding of the object, characteristics and effects of this present disclosure, embodiments together with the attached drawings for the detailed description of the present disclosure are provided.

Objectives, features, and advantages of the present disclosure are hereunder illustrated with specific embodiments, depicted with drawings, and described below.

Figure 2:
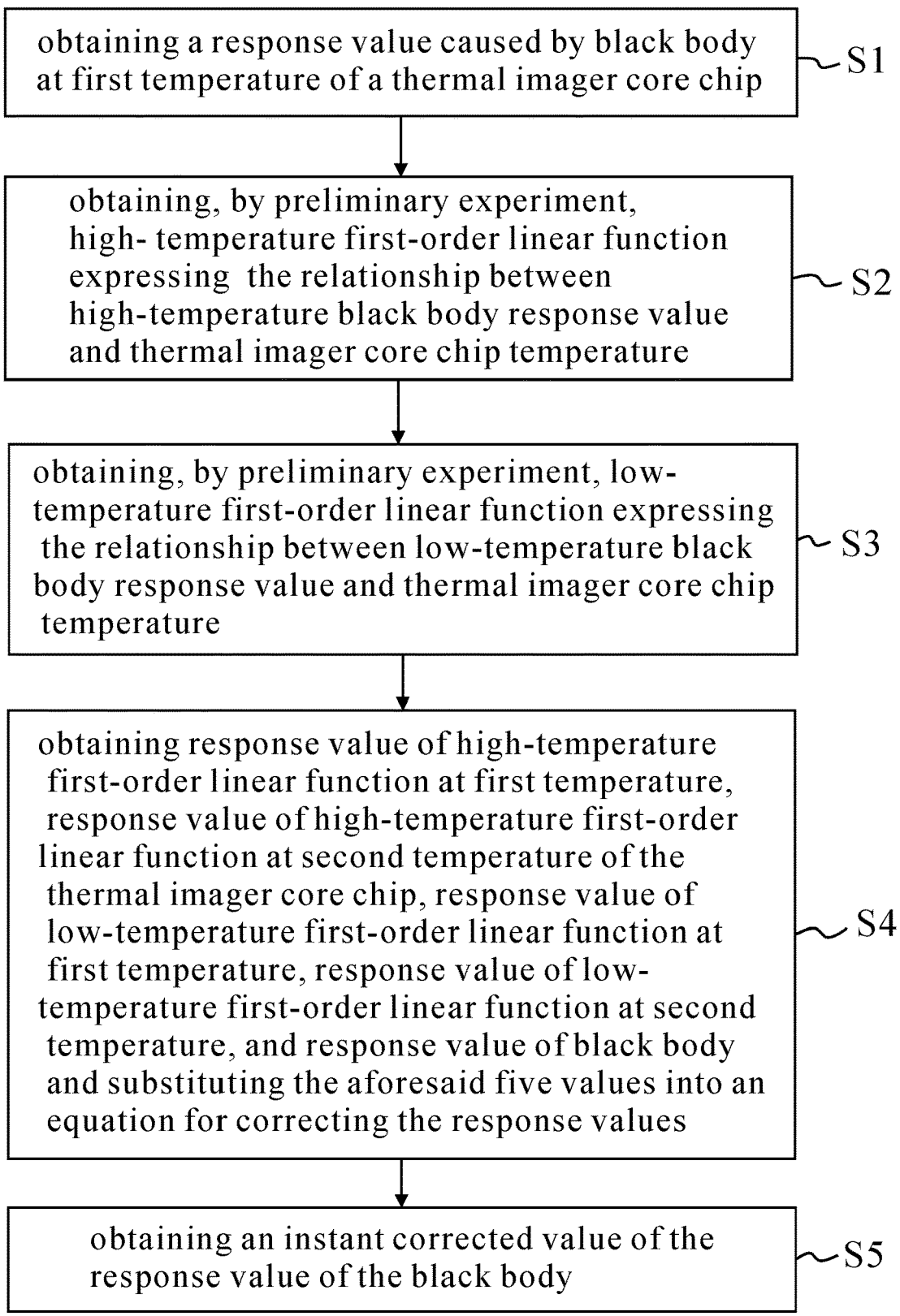
FIG. 2 is a schematic view of the process flow of a method of stabilizing temperature sensing in the presence of temperature-sensing component temperature variation according to the present disclosure.

Referring to FIG. 2, there is shown a schematic view of the process flow of a method of stabilizing temperature sensing in the presence of temperature-sensing component temperature variation according to the present disclosure. The method of stabilizing temperature sensing in the presence of temperature-sensing component temperature variation comprises the steps of: (step S1) obtaining a response value caused by black body at first temperature of a thermal imager core chip; (step S2) obtaining, by preliminary experiment, high-temperature first-order linear function $(f_H)$ expressing the relationship between high-temperature black body response value and thermal imager core chip temperature; (step S3) obtaining, by preliminary experiment, low-temperature first-order linear function $(f_L)$ expressing the relationship between low-temperature black body response value and thermal imager core chip temperature; (step S4) obtaining response value $(f_H(T_1))$ of high-temperature first-order linear function at first temperature, response value $(f_H(T_2))$ of high-temperature first-order linear function at second temperature of the thermal imager core chip, response value $(f_L(T_1))$ of low-temperature first-order linear function at first temperature, response value $(f_L(T_2))$ of low-temperature first-order linear function at second temperature, and response value (x) of black body and substituting the aforesaid five values into an equation for correcting the response values; and (step S5) obtaining an instant corrected value of the response value of the black body. The high-temperature black body and the low-temperature black body are standard black bodes with constant temperature. The high temperature is the highest temperature of the temperature range (to be measured) of the thermal imager. The low temperature is the lowest temperature of the temperature range (to be measured) of the thermal imager.

Figure 1:
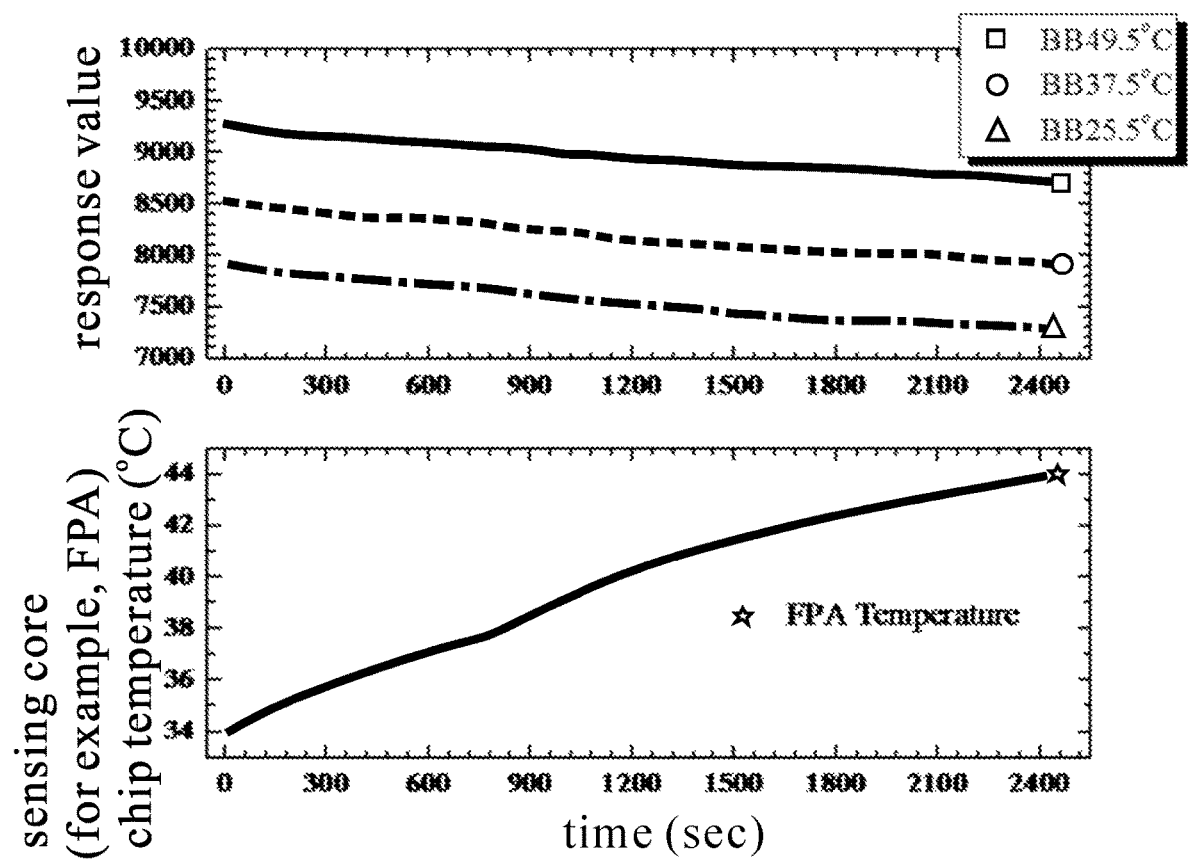
FIG. 1 (PRIOR ART) shows graphs of the black body response value and sensing core (for example, FPA) chip temperature versus time while a conventional thermal imager is measuring black bodies at 49.5° C., 37.5° C., 25.5° C., respectively.
Figure 3:
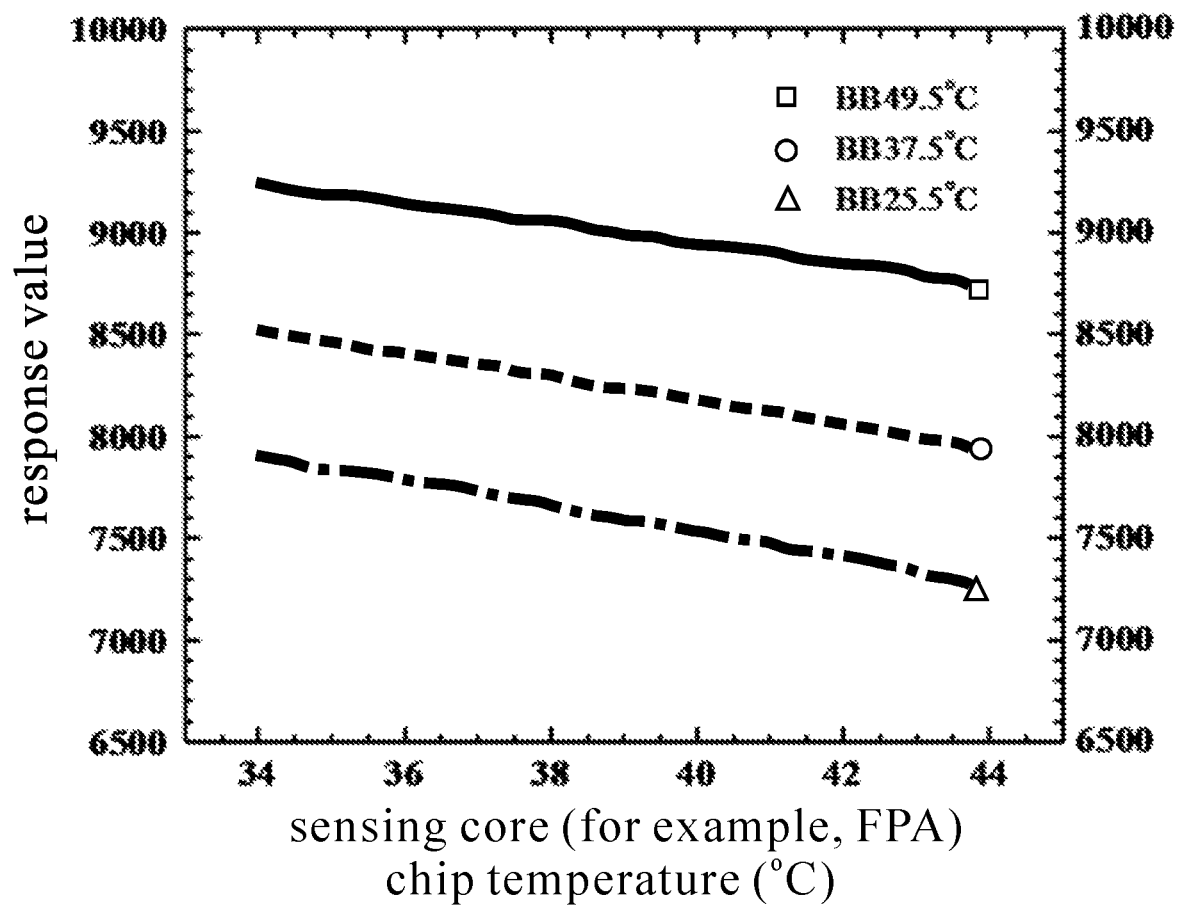
FIG. 3 shows graphs of measurement output response value versus the conventional thermal imager sensing core (for example, FPA) chip temperature.

In an embodiment illustrated by FIG. 1, the diagram shows the linear relation between the operation time and operating temperature of the core (for example, Focal Plane Array, FPA) chip in a conventional thermal imager as well as the relation between the operation time and the temperature response value of black bodies which stand at 49.5° C., 37.5° C., 25.5° C., respectively, so as to generate the graphs of the output response value (expressed as counts) versus the operating temperature of the core (for example, FPA) chip in the conventional thermal imager (non-temperature-sensing thermal imager). FIG. 3 shows that the temperature response value of the black bodies which stand at 49.5° C., 37.5° C., 25.5° C. decrease monotonously and linearly as the core (for example, FPA) chip temperature increases (from 34° C. to 44° C.). Referring to FIG. 3, standard black body temperature is measured and calculated, theoretically speaking, indicating that the higher the count value is, the higher the measured temperature is, because the core (for example, FPA) chip temperature increases with the operation time, leading to increasingly significant inaccuracy in temperature measurement. Therefore, the conventional thermal imager shows a method by applying a system thermal insulating design to a thermoelectric refrigerator and keeping the operating temperature of the core (for example, FPA) chip in the thermal imager constant to keep the measured output response value at a fixed value, so as to infer a fixed measured temperature value (which remains unchanged despite an increase in the operation time of the core (for example, FPA) chip in the thermal imager.) The method has two drawbacks. First, an additional thermal insulating design has to be applied to a thermoelectric refrigerator, and in consequence the system not only requires a precise temperature control circuit but is also bulky and excessively power-consuming. Second, heat generated by the core (for example, FPA) chip has to be removed from the system casing to thereby necessitate customization based on the extent of heat dissipation and power consumption of the core (for example, FPA) chip and its dimensions, and in consequence the manufacturing complexity increases because of the required precise heat dissipation design and assembly of a heat sink and the system casing.

Therefore, with reference to FIG. 3, the present disclosure entails measuring a high-temperature black body and a low-temperature black body by a preliminary experiment. The relationship between the high-temperature black body response value and time as well as the relationship between the thermal imager core chip temperature and time are measured in order to plot graphs of the operating temperature of the core (for example, FPA) chip in the conventional thermal imager versus the measured high-temperature black body response value and thereby infer a high-temperature first-order linear function related to the relationship between the high-temperature black body response value and the core (for example, FPA) chip operating temperature. Likewise, by measuring the relationship between the low-temperature black body response value and time as well as the relationship between the temperature of the thermal imager core chip and time, it is feasible to plot the graphs of the operating temperature of the core (for example, FPA) chip in the conventional thermal imager versus the measured low-temperature black body response value and thereby infer a low-temperature first-order linear function related to the relationship between the low-temperature black body response value and the core (for example, FPA) chip operating temperature.

Then, the response values of the high-temperature first-order linear function at the first temperature and second temperature of the thermal imager core chip, the response value of the low-temperature first-order linear function at the first temperature and second temperature, and the response value of a black body are substituted into an equation for correcting the response values. The equation for correcting the response values is as follows:

$$d = \left\{\left[1 - \frac{f_H(T_1) - x}{f_H(T_1) - f_L(T_1)}\right] \times [f_H(T_1) - f_H(T_2)]\right\} + \left[1 - \frac{x - f_L(T_1)}{f_H(T_1) - f_L(T_1)}\right] \times [f_L(T_1) - f_L(T_2)]\right\}$$

In the equation for correcting the response values, d denotes the instant corrected value of the response value of the black body, x denotes the response value of the black body, $f_H(T_1)$ denotes the response value of the high-temperature first-order linear function at the first temperature, $f_H(T_2)$ denotes the response value of the high-temperature first-order linear function at the second temperature, $f_L(T_1)$ denotes the response value of the low-temperature first-order linear function at the first temperature, $f_L(T_2)$ denotes the response value of the low-temperature first-order linear function at the second temperature, $T_1$ denotes the first temperature of the core (for example, FPA) chip, and $T_2$ denotes the second temperature of the core (for example, FPA) chip.

Figure 4:
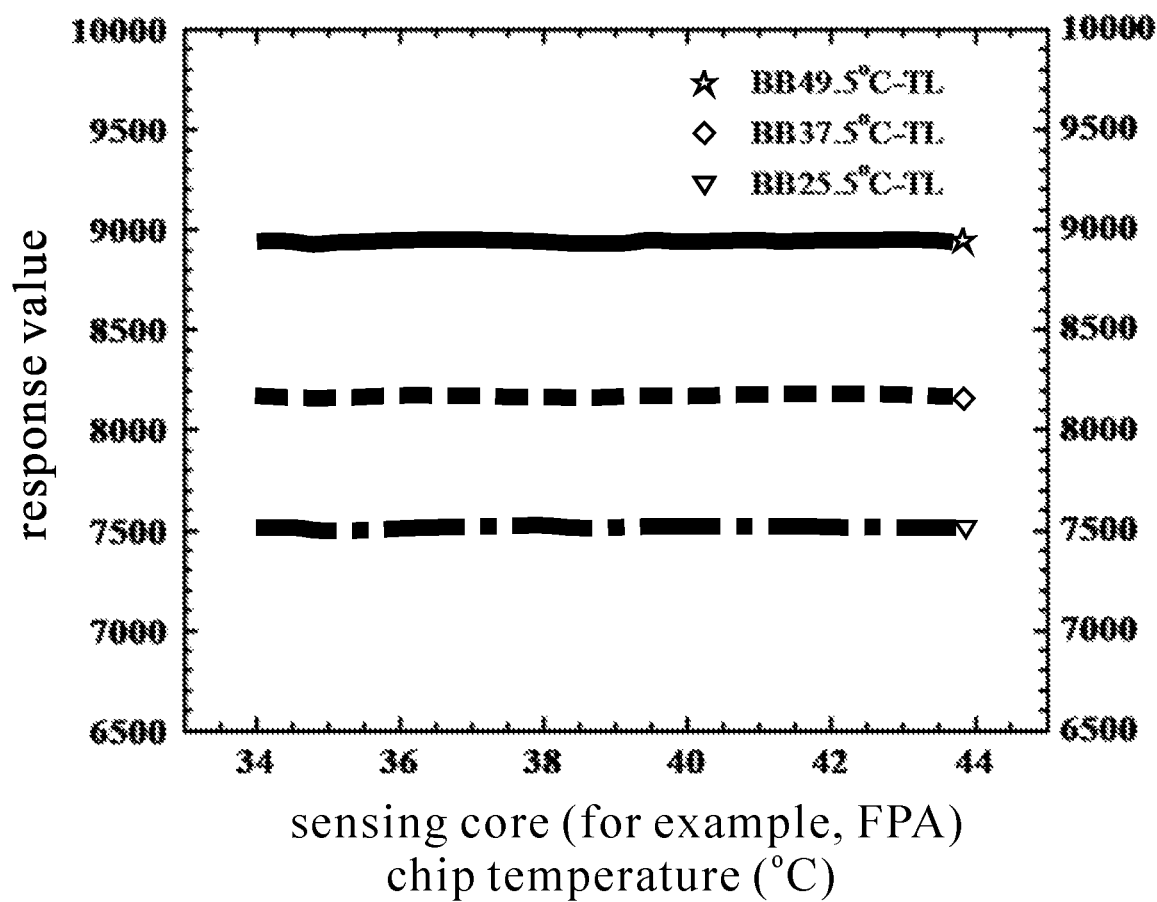
FIG. 4 shows graphs of ideal response value output corrected by the method of the present disclosure and generated by the temperature sensing thermal imager versus sensing core (for example, FPA) chip temperature.

Referring to FIG. 4, there are shown graphs of the corrected ideal response value of the temperature sensing thermal imager versus the operating temperature of the core (for example, FPA) chip, indicating that the corrected ideal response values (counts) remain unchanged despite an increase in the core (for example, FPA) chip temperature. The system in operation keeps measuring the radiation temperature of the standard black bodies which stand at 49.5° C., 37.5° C., 25.5° C., and its output response value does not decrease despite an increase in the core (for example, FPA) chip temperature. In other words, when different core (for example, FPA) chip temperatures are measured, response values generated by black bodies with the same temperature remain unchanged, and then the response values are substituted into a thermal radiation conversion equation to thereby obtain a temperature value substantially equal to the equivalent temperature radiated out from the standard black body, as shown in Table 1.

TABLE 1

| Temperature sensing precision as corrected with correction equation | | | |
| --- | --- | --- | --- |
| | BB 25.5° C. | BB 49.5° C. | BB 37.5° C. |
| AVG | 25.50 | 49.50 | 37.03 |
| STD | 0.09 | 0.08 | 0.07 |
| MIN | 25.13 | 49.23 | 36.77 |
| MAX | 25.73 | 49.70 | 37.24 |
| MED | 25.50 | 49.51 | 37.04 |

The black body temperatures of 49.5° C., 37.5° C., 25.5° C. are measured for around one hour while the thermal imager core (for example, FPA) chip temperature is rising, and the corrected response values are substituted into a thermal radiation conversion equation to obtain black body temperature values of 49.5° C., 37.5° C., 25.5° C., and its precision is shown in Table 1. The measurement of three black body temperatures of 49.5° C., 37.5° C., 25.5° C. has a standard deviation less than or equal to 0.09° C. The difference between the highest temperature and the lowest temperature can be as low as 0.47° C. when measuring the 37.5° C. black body, so as to effectively upgrade a non-temperature-sensing thermal imager to a temperature-sensing thermal imager and demonstrate satisfactory temperature sensing precision. The present disclosure provides a method of stabilizing temperature sensing in the presence of temperature-sensing component temperature variation to measure temperature which ranges from 0° C. to 1000° C. but is not limited to this range. Persons skilled in the art can apply the method of the present disclosure to extrapolation or perform temperature correction with different temperature measurement draws partitioned according to the embodiments of the present disclosure. The concept about partition of different temperature measurement draws is the same as the concept about a multimeter using different draws in accordance with resistances or voltages of different degrees of strength. When different temperature ranges are measured with the method of the present disclosure, correction is carried out according to the embodiments of the present disclosure, thereby achieving the advantage of precise temperature sensing.

In conclusion, the present disclosure provides a method of stabilizing temperature sensing in the presence of temperature-sensing component temperature variation to obtain a corrected response strength value equalizing equation by linear regression first-order correction and obtain a precise, stable temperature value by loading software to a computation chip module or performing instant computation with a computer or microprocessor. Therefore, the present disclosure avoids extra system volume, precludes escalated power consumption, and dispenses with any intricate hardware thermal insulating device. Moreover, the present disclosure addresses a conventional issue with heat dissipation, that is, a heat sink of a core (for example, FPA) chip operating at a constant operating temperature has to be specially designed in order to be capable of conveying the residual heat of the core (for example, FPA) chip to the casing efficiently. Furthermore, the present disclose solves a problem: the conventional thermal imager cannot work without precise temperature control mechanism and requires long-term, stable ambient temperature of the core (for example, FPA) chip in order to attain an accurate, stable measured temperature for a long period of time. In conclusion, the present disclosure is conducive to a reduction in system design complexity, hardware cost and power consumption with a view to attaining the advantage of stable temperature sensing. In an embodiment, the black body temperatures of 49.5° C., 37.5° C., 25.5° C. are measured for around one hour while the thermal imager core (for example, FPA) chip temperature is rising, and then the corrected response values are substituted into a thermal radiation conversion equation to obtain black body temperature values of 49.5° C., 37.5° C., 25.5° C., with its measured temperature values substantially equal to the actual black body standard temperature value.

While the present disclosure has been described by means of specific embodiments, numerous modifications and variations could be made thereto by those skilled in the art without departing from the scope and spirit of the present disclosure set forth in the claims.

What is claimed is:

1. A method of stabilizing temperature sensing in the presence of temperature variation of a thermal imager core chip, the method comprising the steps of:
   (S1) obtaining a response value (x) from the thermal imager core chip at a first temperature ($T_1$) while the temperature of the thermal imager core chip is rising, causing the response value to decrease;
   (S2) obtaining, by preliminary experiment, a high-temperature first-order linear function ($f_H(T)$) expressing relationship between a high-temperature black body response value and the thermal imager core chip temperature, wherein the high-temperature first-order linear function is obtained through derivation of a relationship between the high-temperature black body response value and a time and a relationship between the thermal imager core chip temperature and the time;
   (S3) obtaining, by preliminary experiment, a low-temperature first-order linear function ($f_L(T)$) expressing relationship between a low-temperature black body response value and the thermal imager core chip temperature, wherein the low-temperature first-order linear function is obtained through derivation of a relationship between the low-temperature black body response value and a time and a relationship between the thermal imager core chip temperature and the time;
   (S4) obtaining a response value ($f_H(T_1)$) of the high-temperature first-order linear function at the first temperature, a response value ($f_H(T_2)$) of the high-temperature first-order linear function at a second temperature ($T_2$) of the thermal imager core chip, a response value ($f_L(T_1)$) of the low-temperature first-order linear function at the first temperature, a response value ($f_L(T_2)$) of the low-temperature first-order linear function at the second temperature, and a response value (x) of the black body and substituting the five values into an equation for correcting the response values,
   wherein the equation for correcting the response values is as follows:

$$d = \left\{ \left[1 - \frac{f_H(T_1) - x}{f_H(T_1) - f_L(T_1)}\right] \times [f_H(T_1) - f_H(T_2)] \right\} + \left[1 - \frac{x - f_L(T_1)}{f_H(T_1) - f_L(T_1)}\right] \times [f_L(T_1) - f_L(T_2)]\right\}$$

where d denotes the instant corrected value,
   x denotes the response value of the black body,
   $f_H(T_1)$ denotes the response value of the high-temperature first-order linear function at the first temperature,
   $f_H(T_2)$ denotes the response value of the high-temperature first-order linear function at the second temperature,
   $f_L(T_1)$ denotes the response value of the low-temperature first-order linear function at the first temperature, and
   $f_L(T_2)$ denotes the response value of the low-temperature first-order linear function at the second temperature;
   (S5) obtaining an instant corrected value (d) of the response value (x) of the black body; and
   (S6) calibrating the value (x) of the black body by the instant corrected value (d) to obtain a calibrated response value of the black body.

2. The method of stabilizing temperature sensing in the presence of temperature variation of a thermal imager core chip according to claim 1, wherein the black body temperature is measured for around one hour, such that after the response value of the black body has been corrected according to the instant corrected value, a black body temperature value is obtained with a thermal radiation conversion equation, with a standard deviation less than or equal to 0.09° C.

* * * * *